Sept. 29, 1936.    H. O. LINDGREN    2,055,904
PACKING BOX FOR CENTRIFUGES
Filed Jan. 12, 1933

INVENTOR
Hans Olof Lindgren
BY
Busser and Harding
ATTORNEYS.

WITNESS:

Patented Sept. 29, 1936

2,055,904

UNITED STATES PATENT OFFICE 2,055,904

PACKING BOX FOR CENTRIFUGES

Hans Olof Lindgren, Appelviken, Sweden, assignor to The De Laval Separator Company, New York, N. Y., a corporation of New Jersey Application January 12, 1933, Serial No. 651,324
In Sweden January 30, 1932

4 Claims. (Cl. 286—26)

My invention relates to packing boxes for centrifuges and particularly to the elastic collars employed therein as tightening means.

In a patent granted to me August 7, 1934, No. 1,969,226, there is disclosed a centrifugal bowl and a hollow shaft communicating with the interior of the bowl for discharge of separated liquid therefrom. An elastic collar surrounds the hollow shaft. Means, spaced from the hollow shaft, form an enclosing chamber having fluid communication with the hollow shaft and with a stationary outlet pipe and secure one end of the elastic collar in fixed position. The elastic collar is pressed against the shaft by the pressure of the liquid in the chamber.

Such a collar must not only be sufficiently elastic, but must fit very well to the shaft and effect a completely tight joint at a small liquid pressure. Since it is applied to rapidly revolving shafts which sometimes may vibrate strongly, it is also necessary that the tightening portion of the collar shall follow the shaft in its movement without too great forces being transmitted from the shaft to the collar. When the centrifuge is used for the separation of milk, the collar must be made of a material that can be easily cleaned and that will not impart any odor or taste to the products which come into contact with it. It is also desirable that the material shall have a low coefficient of friction and that it shall not quickly wear or cause a strong wear of the shaft rotating inside the collar. A low coefficient of friction is particularly important owing to the high speed of rotation. These last-mentioned qualities have a special importance for the starting of the centrifugal bowl, especially if, at that time, no provision is made for flowing liquid through the system. If a material with high coefficient of friction be used, the rise of temperature at the contact surface may, during this period, become so high, owing to poor heat conduction, that the material of the packing will be destroyed.

We have found that rubber satisfies most of the above conditions. It is elastic, can easily be cleaned, and, as long as the temperature is kept within normal limits, no odor or taste is imparted to the milk. It has been found objectionable, however, to allow the rubber to come into direct contact with the rotating shaft. If the liquid could be allowed to pass between the collar and the shaft, no objectionable phenomena would of course occur. With the collars used for the present purpose a complete tightening is, however, required. If the rubber and the shaft are in direct contact and no layer of liquid exists between them, a strong rise of temperature takes place, so that the rubber is softened and sticks to the shaft in about the same manner as a bronze alloy on a steel shaft, which may cause both the shaft and the collar to be damaged. Products having a strong taste or odor may also be transferred to the milk.

One object of the present invention is to provide a collar, the greater part of which is made of rubber which, on the surface that is in contact with the shaft, is coated with a material of such qualities that a tight joint can be effected without causing such a high rise of temperature that the operation of the machine will be jeopardized. The elastic collar is somewhat improved if it is provided with a wearing surface made of cloth, as canvas or the like. A collar of this type is sometimes found suitable for use when it is required to make a tight joint against water and when it is applied to shafts of a small diameter, but has proved unsatisfactory in connection with liquids which, like milk, may cause depositions of organic or inorganic matters. I have discovered, however, that the collar will function satisfactorily, when applied to a milk separator or clarifier, if the interior of the collar is lined with asbestos or a mixture of asbestos and a strengthening means which increases the stability of the asbestos layer. The strengthening means may consist of fibres either of organic origin, for instance cotton, or inorganic origin, for instance fine metal wires. A collar of such construction resists high temperature more effectively than if it is lined with a web of entirely organic origin. In some cases it is desirable to impregnate the lining with a lubricant, as oil, fat or graphite, which preferably is introduced in the manufacture of the lining. The use of a lubricant may also be advantageous in collars having a lining of organic material. Generally it is advantageous to have the lining placed in the collar during the vulcanization, thereby insuring their permanent attachment. It is, however, important to prevent the rubber mass from penetrating through the whole lining during the vulcanization. Such a collar would have most of the defects of an unlined rubber collar. Sometimes it may be desirable to have the lining removable from the collar. In such case the lining may be loose fitting and may be a tube-shaped part pressed in a mould and consisting of an armature structure of metal which carries the tightening material, the latter comprising a mixture of asbestos and graphite. Such a lining, if removability be not required, may be vulcanized fast to the collar.

Different methods of manufacture must be employed according to the nature of the lining. It should be strongly emphasized that one necessary condition is that the inner layer of the lining shall be free from rubber, as otherwise the disagreeable consequences hereinbefore referred to of contact between the rubber and the shaft may sooner or later develop. It must also be kept in mind that rubber is attacked by most organic lubricants, and steps must be taken to avoid the diffusion of the lubricant to the rubber.

When using as a lining a thin cloth it has been found practicable to build up the lining of a great number of layers held together by rubber solution and consisting of long slips which are wound upon a suitable mandrel. The lining may then be fixed to the collar by means of vulcanization. It has also been found practicable to use as a lining a piece of canvas hose, or a hose that is spun and woven of asbestos. In case it is desired to use a comparatively loose fabric it is necessary to guard against the penetration of the rubber to the inner surface of the lining during the vulcanization. This may be effected by impregnating the inner part of the lining with a substance that solidifies and forms a wall through which the rubber cannot penetrate. Such substance may be afterward removed by means of a suitable dissolving means. I have found that shellac and certain cellulose lacs may be used for this purpose. In some cases it is practicable wholly to impregnate the lining with a material of this kind and then to dissolve the impregnating material in the outer layer of the lining so that a zone is formed beyond which the rubber cannot penetrate during the vulcanization. This process is suitable when the pores of the lining can absorb a large proportion of the impregnating means. The dissolving means must of course not attack the rubber. This process may be used to advantage for collars whose lining cannot be impregnated with a lubricant, as one can never be sure that a layer is formed which isolates the lubricant from the rubber. In other cases it is suitable to produce between the lining and the rubber a thin metallic layer to which the rubber is fixed by the vulcanization. For example, a thin metal layer may be precipitated on the outside of the carefully graphite-coated lining, nickel and iron being the most suitable metals. The whole of the lining may be impregnated with graphite before the precipitation of the metal. This method is particularly suitable for collars whose lining consists of a tube pressed of metal, asbestos and graphite. The layer separating the lining and the rubber may also consist of a sleeve embracing the lining and pressed of very thin metal.

In the foregoing variations of the process it has been assumed that the lining consists of only one part, but this is not necessary, as in some cases it may be more suitable to provide the collar with two or more spaced apart annular linings. Between the linings and the collar and the shaft small chambers are thus formed which are filled with air or liquid.

Figure 1:
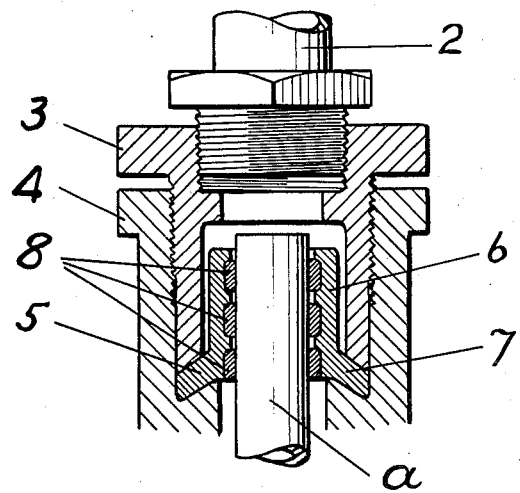
Fig. 1 is a sectional elevation of a packing box embodying my invention.

In Figure 1, a represents a hollow shaft, rotating with a centrifugal separating bowl (not shown), through which flows the mixture to be separated, or the liquid to be purified, or the purified liquid, or one of the separated liquids. Through a stationary packing box the hollow shaft communicates with an inlet or outlet pipe 2. The packing box comprises a chamber formed of two annular members, one (4) threaded upon the other (3), enclosing the rubber collar 5, which consists of a cylindrical or tube-shaped portion 6 having an annular foot or flange 7 confined between the lower edge of the member 3 and an internal annular flange at the bottom of the member 4. The lining shown comprises three spaced apart sections 8.

Figure 2:
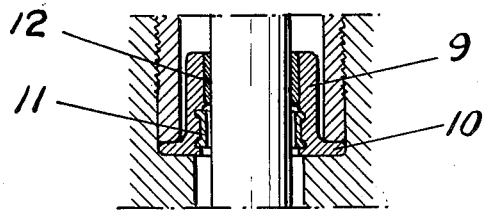
Figs. 2 and 3 are sectional elevations of modified forms of collar.

Fig. 2 illustrates a modification which has been found particularly efficient for making a tight joint against high pressures. The collar 9 with its foot or flange 10 must be efficiently pressed against a seat in the stationary chamber. In operation the foot of the collar is sometimes deformed in such manner that a high contact pressure between the collar and the shaft is created before admission of the liquid. This is avoided by providing a ring 11 of metal in the tube shaped portion within or adjacent the end thereof provided with the foot. The ring reduces the compression of the collar. The remaining part of the collar is provided with a lining 12. If desired the ring may be applied to the rubber mass before vulcanization.

Figure 3:
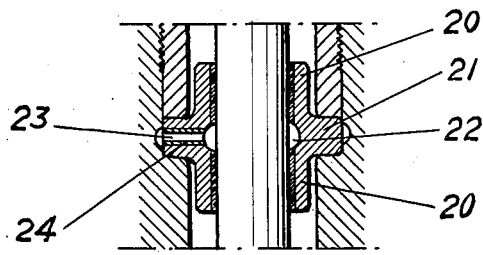

Fig. 3 illustrates a modification which is suitable for use when a tightening device is arranged between chambers through which flow two different liquids, as, for example, separated milk and cream, as in my application filed September 18, 1931, Serial No. 563,540. This application discloses two collars with opposing feet spaced apart to form a chamber which may be put into communication with the atmosphere, so that any liquid which leaks past either of the collars will escape through the chamber. Instead of using two separate collars I have found it practicable to employ a single collar comprising end tubular portions 20 having an intermediate circumferential flange 21. If it is desired to make provision for the escape of leakage liquid, the collar may have formed within its flanged intermediate portion an annular collection chamber 22, with channels 23 in the flange for the discharge of such liquid. In order to avoid deformation of the collar when it is fixed in position (which might clog the discharge channels), the channels should be lined with metal tubes 24, which are preferably placed in the collar before vulcanization.

I have not herein claimed the herein described processes of manufacturing the composite collar forming the subject matter of certain of the appended claims. Such processes are described and claimed in an application, Serial No. 698,779, filed November 20, 1933, now Patent No. 2,011,180, issued August 13, 1935, as a division of the present application.

What I claim and desire to protect by Letters Patent is:

1. The combination with a rotatable shaft and a stationary packing box, of a collar surrounding and engaging the shaft and enclosed and fixedly secured by the packing box; said collar comprising a relatively thick member of rubber and a relatively thin lining of asbestos of a texture rendering it inherently permeable to its inner surface by rubber in the process of vulcanization; the said inner asbestos lining being culcanized fast to the outer member and comprising an outer zone penetrated by rubber and an inner zone free of rubber.

2. The combination with a rotatable shaft and a stationary packing box, of a collar surrounding and engaging the shaft and enclosed and fixedly secured by the packing box; said collar comprising a relatively thick member of rubber and a relatively thin lining of comparatively inelastic material of a texture rendering it inherently permeable to its inner face by rubber in the process of vulcanization; the said inner lining being vulcanized fast to the outer member and comprising an outer zone penetrated by rubber and an inner zone free of rubber.

3. The combination of a rotatable shaft, a collar surrounding and engaging the shaft and provided with an end flange, and a stationary packing box enclosing the collar and so engaging said flange as to hold the collar fixedly; said collar comprising an outer member of elastic material, an inner lining engaging the shaft and extending through a part of the outer member non-adjacent its flange, and a metal ring extending within and part way through that part of the outer member adjacent its flange, said ring being spaced from the shaft.

4. The combination of a rotatable shaft, a collar, comprising elastic material, surrounding and engaging the shaft and provided, between its ends, with a circumferential flanged portion, and a stationary packing box enclosing the collar and so engaging the flanged portion as to secure the collar fixedly, there being an annular chamber within said flanged portion and a channel comprising a metal tube carried by said collar and communicating with said chamber.

HANS OLOF LINDGREN.